(12) United States Patent
Bellis

(10) Patent No.: US 8,814,505 B2
(45) Date of Patent: Aug. 26, 2014

(54) MECHANICAL ARRANGEMENT

(75) Inventor: Mark J. E. Bellis, Derby (GB)

(73) Assignee: Rolls-Royce PLC, London (GB)

( * ) Notice: Subject to any disclaimer, the term of this patent is extended or adjusted under 35 U.S.C. 154(b) by 599 days.

(21) Appl. No.: 13/202,924

(22) PCT Filed: Feb. 22, 2010

(86) PCT No.: PCT/EP2010/001083
§ 371 (c)(1),
(2), (4) Date: Aug. 23, 2011

(87) PCT Pub. No.: WO2010/108576
PCT Pub. Date: Sep. 30, 2010

(65) Prior Publication Data
US 2011/0305572 A1 Dec. 15, 2011

(30) Foreign Application Priority Data
Mar. 24, 2009 (GB) .................. 0904913.1

(51) Int. Cl.
F01D 15/12 (2006.01)
F02C 3/107 (2006.01)
B64C 11/48 (2006.01)
B64C 11/30 (2006.01)
B64D 35/06 (2006.01)
B64D 27/00 (2006.01)

(52) U.S. Cl.
CPC .......... F01D 15/12 (2013.01); F05D 2220/325 (2013.01); F02C 3/107 (2013.01); B64C 11/48 (2013.01); Y02T 50/66 (2013.01); F05D 2220/324 (2013.01); B64C 11/306 (2013.01); F05D 2260/40311 (2013.01); B64D 2027/005 (2013.01); B64D 35/06 (2013.01)
USPC ........ 415/124.1; 415/68; 416/170 R; 475/332

(58) Field of Classification Search
USPC .......... 415/122.1, 124.1, 60, 66, 68; 416/170 R, 124–129, 198 A, 198 R, 200; 475/332, 343
See application file for complete search history.

(56) References Cited

U.S. PATENT DOCUMENTS 2,583,872 A * 1/1952 Newcomb ............ 475/332
4,567,788 A * 2/1986 Miller .................. 475/142

(Continued)

FOREIGN PATENT DOCUMENTS

EP 1 881 176 A2 1/2008
GB 1 436 491 5/1976
GB 2 225 297 A 5/1990

OTHER PUBLICATIONS

British Search Report issued in Application No. GB0904913.1 dated Jul. 2, 2009.

(Continued)

Primary Examiner — Ned Landrum
Assistant Examiner — Joshua R Beebe
(74) Attorney, Agent, or Firm — Oliff PLC

(57) ABSTRACT

A mechanical arrangement for an engine having two propeller stages, including: a first epicyclic gear stage including a sun gear, a planet gear, a planet carrier and an annulus, wherein the sun gear is driven by a shaft of the engine, the planet carrier is stationary and thereby permits static structure to be located there through, and the annulus outputs torque and/or drive; a second epicyclic gear stage including a second sun gear, a second planet gear, a second planet carrier and a second annulus, wherein the second sun gear is driven by the annulus of the first epicyclic gear stage and is annular to accommodate the static structure, the second planet carrier includes the output to one of the propeller stages and the second annulus includes the output to the other of the propeller stages; wherein the static structure provides mounting for static components on one or both sides of each epicyclic gear stage.

15 Claims, 4 Drawing Sheets

(56) References Cited

U.S. PATENT DOCUMENTS

| | | | |
|---|---|---|---|
| 4,842,484 A | | 6/1989 | Johnson |
| 4,964,844 A | * | 10/1990 | Bagnall .................. 475/295 |
| 2005/0130792 A1 | * | 6/2005 | Drago et al. ............. 475/331 |
| 2008/0279686 A1 | * | 11/2008 | Demtroder ............... 416/61 |

OTHER PUBLICATIONS

International Search Report issued in Application No. PCT/EP2010/001083 dated Oct. 5, 2010.

Written Opinion issued in Application No. PCT/EP2010/001083 dated Oct. 5, 2010.

* cited by examiner

MECHANICAL ARRANGEMENT

The present invention relates to a mechanical arrangement for an engine having two propeller stages. It is particularly, though not exclusively, relevant to a gas turbine engine having two contra-rotating propeller stages in either a "pusher" or "puller" configuration.

It is known to drive two stages of propellers at different speeds and/or directions about a common axis by the use of an epicyclic gear arrangement. Drive is output from the engine and is shared in predetermined proportions between the two propeller stages by predetermination of the gear ratios. For example, in a "pusher" configuration of engine used for propulsion of a vehicle such as an aircraft, where the propeller stages are axially behind the engine, the planet carrier may drive the front propeller stage whilst the annulus or ring gear drives the rear propeller stage.

One disadvantage of this arrangement is that it is not simple to locate additional components, for example a pitch control mechanism or monitoring equipment, axially behind the epicyclic gear arrangement. This is because to pass signals and fluids from the engine to the components requires the signals or fluids to pass from the static engine frame of reference, through the front propeller stage rotating frame of reference and into the differently rotating rear frame of reference. Thus, slip rings and muff couplings must be provided at the interface between each pair of frames of reference, all of which are liable to be heavy, prone to leakage and increase the possible failure modes. Furthermore, any control calculations, for example to determine the amount of pitch alteration required for the rear propeller stage, must take account of the signal passage through the stationary and front frames of reference.

Alternatively, the additional components may be mounted in the rear rotating frame of reference and be controlled by components that are also in that frame of reference. However, it is understood by those skilled in the art that it is complex to formulate and implement control algorithms spanning multiple moving frames of reference.

The present invention seeks to provide a mechanical arrangement for an engine having two propeller stages that seeks to address the aforementioned problems.

Accordingly the present invention provides a mechanical arrangement for an engine having two propeller stages, comprising: a first epicyclic gear stage comprising a sun gear, a planet gear, a planet carrier and an annulus, wherein the sun gear is driven by a shaft of the engine, the planet carrier is stationary and thereby permits static structure to be located therethrough, and the annulus outputs torque and/or drive; a second epicyclic gear stage comprising a second sun gear, a second planet gear, a second planet carrier and a second annulus, wherein the second sun gear is driven by the annulus of the first epicyclic gear stage and is annular to accommodate the static structure, the second planet carrier comprises the output to one of the propeller stages and the second annulus comprises the output to the other of the propeller stages; wherein the static structure provides mounting for static components on one or both sides of each epicyclic gear stage.

This provides the advantage that static structure can be located to provide sensing, control or monitoring functions for both stages of propellers without having to pass through the front propeller rotating frame of reference to reach the rear propeller rotating frame of reference.

The static structure may comprise at least one conduit. The at least one conduit may transport at least one of the group comprising electrical signals, cooling fluid, lubricant and actuation fluid.

The static components may comprise a pitch control mechanism, a pitch lock mechanism or monitoring means, each for at least one of the propeller stages.

The engine shaft may be a power turbine shaft.

The engine may comprise a gas turbine engine having contra-rotating propeller stages, a marine thruster having two propeller stages, a helicopter engine having a dual row rotor or a wind turbine having a dual row rotor. Where the engine is a helicopter engine the static components may comprise a radar mechanism. Where the engine is a helicopter engine or a wind turbine the static components may comprise an instrument pod.

The components may be arranged coaxially in the sequential order: engine, at least one static component, first epicyclic gear stage, second epicyclic gear stage, at least one static component. Alternatively, they may be arranged coaxially in the sequentially order: at least one static component, second epicyclic gear stage, first epicyclic gear stage, at least one static component, engine.

The present invention will be more fully described by way of example with reference to the accompanying drawings, in which.

Figure 1:
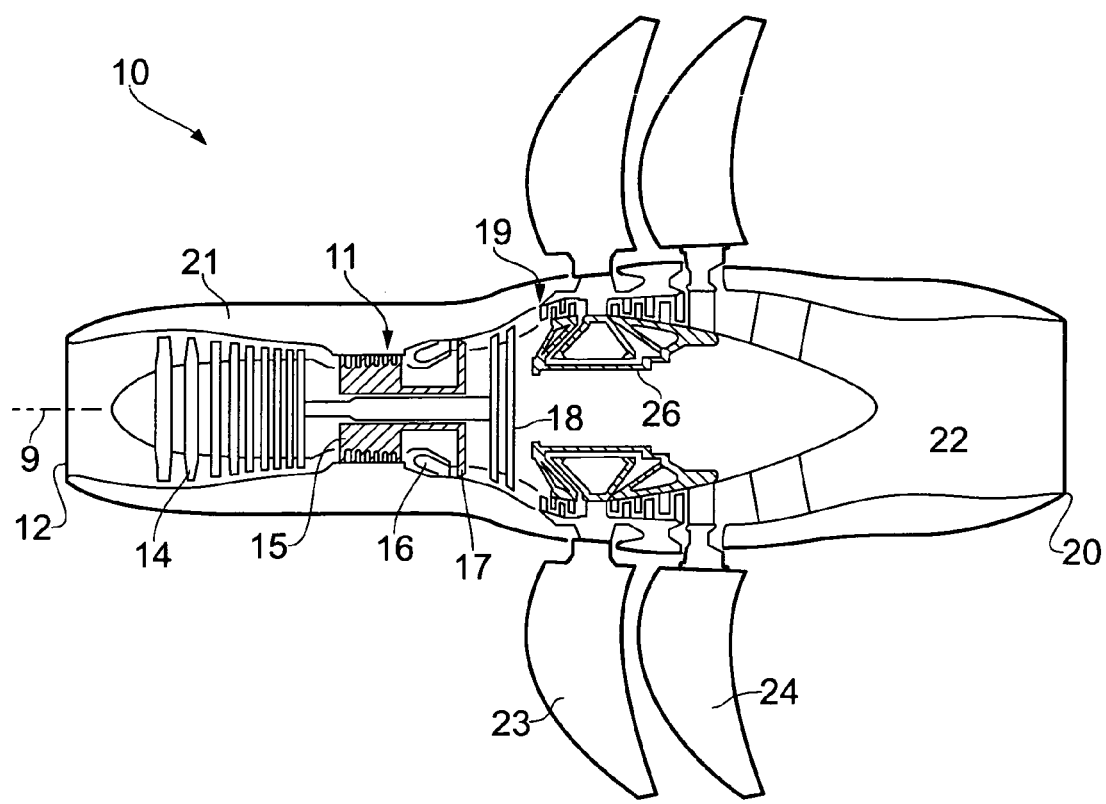
FIG. 1 is a sectional side view of gas turbine engine having contra-rotating propeller stages.

Referring to FIG. 1, a twin-spooled, contra-rotating propeller gas turbine engine is generally indicated at 10 and has a principal rotational axis 9. The engine 10 comprises a core engine 11 having, in axial flow series, an air intake 12, an intermediate pressure compressor 14, a high-pressure compressor 15, combustion equipment 16, a high-pressure turbine 17, intermediate pressure turbine 18, a free power (or low-pressure) turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller stages 23, 24 attached to and driven by the free power turbine 19 via shaft 26.

The gas turbine engine 10 works in a conventional manner so that air entering the intake 12 is accelerated and compressed by the intermediate pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, intermediate pressure and free power turbines 17, 18, 19 before being exhausted through the nozzle 20 to provide some propulsive thrust. The high-pressure, intermediate pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust. In the embodiments herein described the propellers 23, 24 rotate in opposite senses so that one rotates clockwise and the other anti-clockwise around the engine's rotational axis 9.

Figure 2:
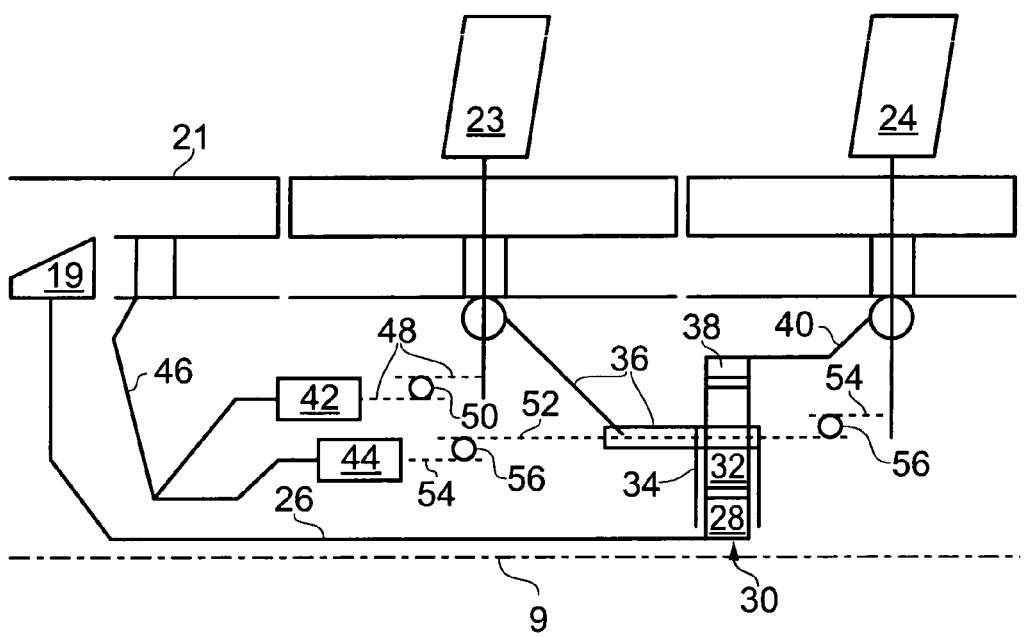
FIG. 2 is a schematic top-half sectional enlargement of a prior art mechanical arrangement for a two-stage propeller engine.

A mechanical arrangement for a two-stage propeller gas turbine engine according to the prior art is shown in FIG. 2. The free power turbine 19 drives the shaft 26, which is coupled synchronously to a sun wheel 28 of an epicyclic, differential gear arrangement 30. Radially outwardly of the sun wheel 28 and intermeshing therewith, in conventional manner, is a plurality of planet gears 32 that are coupled together by a planet carrier 34. The planet carrier 34 constrains the planet gears 32 to progress around the sun wheel 28 in synchronicity whilst enabling each planet gear 32 to rotate about its own axis independently. The planet carrier 34 is coupled via linkages 36 to the front propeller stage 23 in order to drive its rotation about the engine axis 9. Radially outwardly of the planet gears 32 and intermeshing therewith is an annulus or ring gear 38 that is coupled, via linkages 40, to the rear propeller stage 24 to drive its rotation about the engine axis 9 in the opposite sense to the front propeller stage 23.

In order to change the pitch of the rotor blades in either propeller stage 23, 24 it is necessary to provide actuators 42, 44 that are in the stationary frame of reference. Thus, linkages 46 connect the actuators 42, 44 to a stationary part of the engine 10, for example the nacelle 21. The actuator 42 is coupled to the front propeller stage 23 via rods 48 and race 50 so that linear movement of the rods 48, driven by actuator 42, causes each rotor blade of the front propeller stage 23 to rotate about its own axis to alter the pitch of the blade to the airflow.

The actuator 44 is coupled to the rear propeller stage 24 in order to alter the pitch of the rotor blades in a similar manner. However, the coupling is more complex as the actuator 44 is located in the stationary frame of reference whereas the rear propeller stage 24 is in its own rotating frame of reference and the coupling must pass through the front rotating frame of reference associated with the front propeller stage 23. Thus rods 52 pass through a hollow portion of the planet carrier 34 and planet gears 32 and are coupled to further rods 54 by races 56. The rods 54 are respectively connected to the actuator 44 and to the rear propeller stage 24. The combination of the rods 52, 54 and races 56 transmit the pitch change signals from the actuator 44 to the rotor blades of the rear propeller stage 24 across the front rotating frame of reference from the stationary frame of reference.

Whilst only a single rod 52, 54 is shown in each position and a single actuator 42, 44 for each propeller stage 23, 24, it will be apparent to the skilled reader that there will be a plurality of rods forming an annular array. There may be one rod arrangement for each rotor blade of the propeller stage 23, 24 or one rod arrangement may actuate several rotor blades. Similarly, there may be one actuator 42, 44 or there may be an annular array of them.

Various bearings (not shown) can be provided between parts of the mechanical arrangement to ensure the stationary and rotating parts interact smoothly. These will be particularly necessary between the rods 52 and the planet carrier 34 and planet gears 32.

Figure 3:
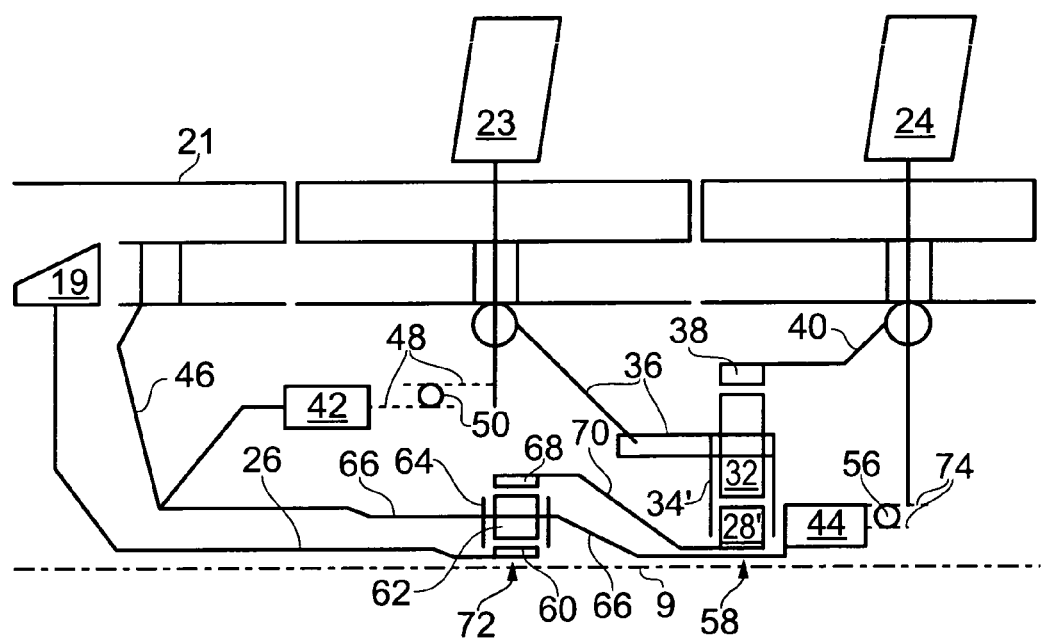
FIG. 3 is a schematic top-half section through a mechanical arrangement for a two-stage propeller engine according to the present invention.

An exemplary embodiment of the present invention is shown in FIG. 3, which has some components in common with the prior art arrangement in FIG. 2 that are given like reference numerals. The free power turbine 19 in the arrangement of the present invention drives, via shaft 26, a first epicyclic gear stage 58. The shaft 26 is coupled to the sun wheel 60 of the first epicyclic gear stage 58 which intermeshes with a plurality of planet gears 62 radially outwardly thereof. The planet gears 62 are ganged together via planet carrier 64 which is stationary and forms part of a static structure 66 that passes through the planet gears 62 and couples to the linkages 46 that connect the actuator 42 to a static structure, such as the nacelle 21, of the engine 10. Thus, each planet gear 62 can rotate about its own axis but the set of planet gears 62 does not progress around the sun wheel 60.

The static structure 66 extends away from the first epicyclic gear stage 58, on the opposite side to the free power turbine 19.

Radially outwardly of the planet gears 62 is an annulus 68 that outputs torque and/or drive through angled shaft 70 to the sun wheel 28' of a second epicyclic gear stage 72. The second epicyclic gear stage 72 is similar to the epicyclic gear arrangement 30 of the prior mechanical arrangement shown in FIG. 2 except for two features. Firstly, the sun wheel 28' is hollow, or annular, so that the static structure 66 can extend therethrough. Secondly, the planet carrier 34' is not hollow since no rods 52 need to pass through it. As in the prior arrangement, the planet carrier 34' is coupled to the front propeller stage 23 by linkages 36 to rotate the stage 23 about the engine axis 9 whilst the annulus 38 is coupled to the rear propeller stage 24 by linkages 40 to rotate the stage 24 in the opposite sense about the engine axis 9.

The actuator 44 is connected to the static structure 66 beyond the second epicyclic gear stage 72, further from the free power turbine 19 and first epicyclic gear stage 58. A pair of short rods 74, coupled by race 56, connects the actuator 44 to the rear propeller stage 24 to transmit the pitch change signals from the actuator 44 to the rotor blades of the rear propeller stage 24. Thus the actuator 44 is in a stationary frame of reference but is situated beyond the epicyclic gear stages 58, 72. This means the rods 74 are short, and therefore there is little or no torsional effect along their length in transmitting the pitch change signals from the actuator 44 to the rear propeller stage 24. Actuator 42 may similarly be located close to the front propeller stage 23 to minimise the length of rods 48 and prevent the requirement to measure the torque of the rods 48 in addition to measuring the torque of the shaft 26. Furthermore, simplifying and shortening the rod trains 48, 74, improves the control accuracy of the pitch change as torsional slippage is eliminated. In addition, because there are fewer components in the actuation train between actuator 44 and the rear propeller stage 24, there are fewer components to fail and therefore the failure rate is improved over the prior art.

Figure 4:
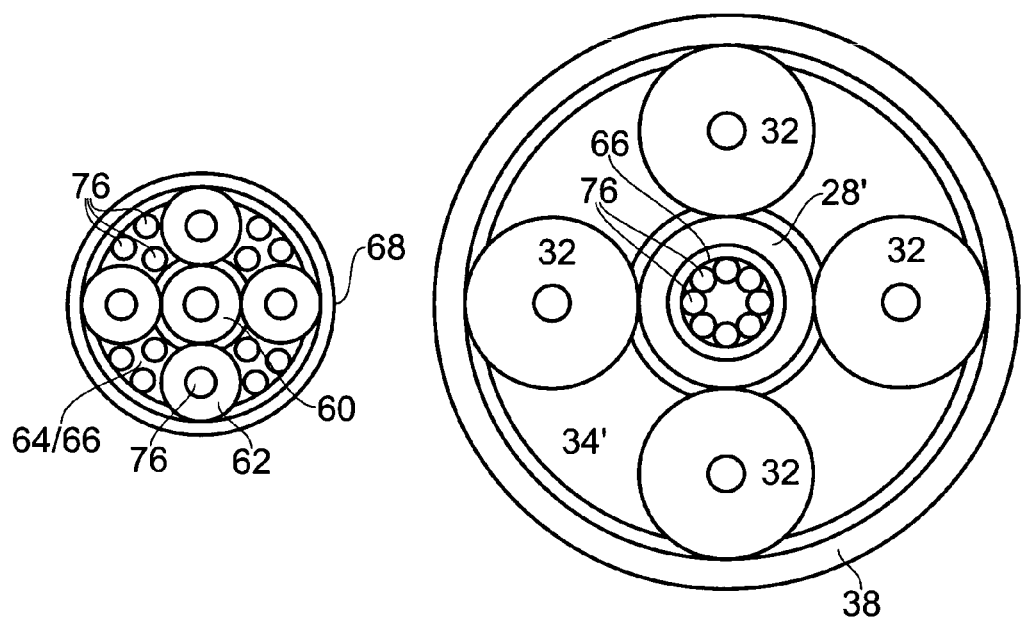
FIG. 4 is a schematic axial section through each epicyclic gear stage according to the present invention.

FIG. 4 shows an axial schematic section through each of the first and second epicyclic gear stages 58, 72. The planet carrier 64 of the first epicyclic gear stage 58 is integral with the static structure 66 in this embodiment, although it may be coupled thereto in other embodiments. The static structure 66 advantageously comprises a plurality of conduits 76 through which can pass electrical wires or fluids for actuation or cooling. The conduits 76 may also pass through the centre of each planet gear 62. These conduits 76 pass along the angled shaft 70 and continue through the hollow centre of the sun wheel 28' of the second epicyclic gear stage 72 to deliver their contents to the actuator 44 or other components beyond the second epicyclic gear stage 72. Since multiple conduits 76 can be provided within the static structure 66 it is simple to transport different contents in different conduits 76. For example, some conduits 76 may contain electrical wires transmitting control signals to the actuator 44 and relaying monitoring signals back to control functions in the engine 10 whilst other conduits 76 transport hydraulic or pneumatic fluid to cause the actuation of the actuator 44 and still other conduits 76 could transport cooling fluid to counteract the heat generated in the second epicyclic gear stage 72. It will be understood that the contents of the conduits 76 detailed herein is exemplary only; those skilled in the art will readily employ the conduits 76 to transport or transmit anything required in a stationary frame of reference close to the rear propeller stage 24 and beyond the front rotating frame of reference.

Since the prior art rods 52 are removed from passing through the planet carrier 34 and planet gears 32, there is no mechanical load exerted between the second epicyclic gear stage 72 and the actuation train for the rear actuator 44. Thus, the failure dependency between them is reduced or eliminated.

By providing the two epicyclic gear stages 58, 72 it is possible to provide greater flexibility in the gear ratios available between the front and rear propeller stages 23, 24. This can be beneficial in applications where the diameter of the epicyclic gear arrangement 30 of the prior mechanical arrangement is limited, due to the dimensions of the engine 10.

Although the static components have been described as actuators 42, 44 they may equally be monitoring arrangements or a combination of actuators and monitoring arrangements. It can be particularly beneficial to provide monitoring arrangements, such as sensors, close to the rear propeller stage 24 to determine whether actuation has occurred as instructed and to identify fault conditions at onset when corrective action may be taken. This may require actuators co-situated with the sensors at 44, for example pitch control actuators. Additionally stop components such as a pitch lock mechanism may be provided to ensure the rotor blades cannot be driven to too great a pitch angle in failure conditions.

Although the present invention has been described with respect to a contra-rotating gas turbine engine 10 in the "pusher" configuration, it is equally applicable to an engine in the "puller" configuration in which the propeller stages 23, 24 are forward of the engine 10 relative to the direction of airflow through the engine 10. Similarly, the arrangement of the present invention may be applied with equal felicity to any engine, other than a gas turbine engine, having two rows of propellers that require actuation, cooling, control or monitoring. For example, the present invention could be applied to a marine thruster having two propellers. Alternatively it could facilitate mounting a radar or instrumentation pod on top of a dual row helicopter rotor or to mount a pod on a dual row wind turbine to measure weather in front of the turbine.

The invention claimed is:

1. A mechanical arrangement for an engine having two propeller stages, comprising:
    a first epicyclic gear stage comprising a sun gear, a planet gear, a planet carrier and an annulus, wherein the sun gear is drivable by a shaft of the engine, the planet carrier is stationary and thereby permits static structure to be located therethrough, and the annulus outputs torque and/or drive;
    a second epicyclic gear stage comprising a second sun gear, a second planet gear, a second planet carrier and a second annulus, wherein the second sun gear is driven by the annulus of the first epicyclic gear stage and is annular to accommodate the static structure, the second planet carrier comprises an output to one of the propeller stages and the second annulus comprises an output to the other of the propeller stages;
    wherein the static structure provides mounting for static components on one or both sides of each epicyclic gear stage.

2. A mechanical arrangement as claimed in claim 1 wherein the static structure comprises at least one conduit.

3. A mechanical arrangement as claimed in claim 2 wherein the at least one conduit transports at least one of the group comprising electrical signals, cooling fluid, lubricant and actuation fluid.

4. A mechanical arrangement as claimed in claim 1 wherein the static components comprise a pitch control mechanism for at least one of the propeller stages.

5. A mechanical arrangement as claimed in claim 1 wherein the static components comprise a pitch lock mechanism for at least one of the propeller stages.

6. A mechanical arrangement as claimed in claim 1 wherein the static components comprise monitoring means for monitoring at least one propeller stage.

7. A mechanical arrangement as claimed in claim 1 wherein the engine shaft is a power turbine shaft.

8. A mechanical arrangement as claimed in claim 1 wherein the engine is a gas turbine engine having contra-rotating propeller stages.

9. A mechanical arrangement as claimed in claim 1 wherein the engine comprises a marine thruster having two propeller stages.

10. A mechanical arrangement as claimed in claim 1 wherein the engine comprises a helicopter engine having a dual row rotor.

11. A mechanical arrangement as claimed in claim 10 wherein the static components comprise a radar mechanism.

12. A mechanical arrangement as claimed in claim 10 wherein the static components comprise an instrument pod.

13. A mechanical arrangement as claimed in claim 1 wherein the engine comprises a wind turbine having a dual row rotor.

14. A mechanical arrangement as claimed in claim 1 wherein the components are arranged coaxially in the sequential order: engine, at least one static component, first epicyclic gear stage, second epicyclic gear stage, at least one static component.

15. A mechanical arrangement as claimed in claim 1 wherein the components are arranged coaxially in the sequential order: at least one static component, second epicyclic gear stage, first epicyclic gear stage, at least one static component, engine.

* * * * *